March 25, 1941.  S. D. BRIDGES ET AL  2,236,328
FARMING IMPLEMENT
Filed Jan. 31, 1939   5 Sheets-Sheet 1
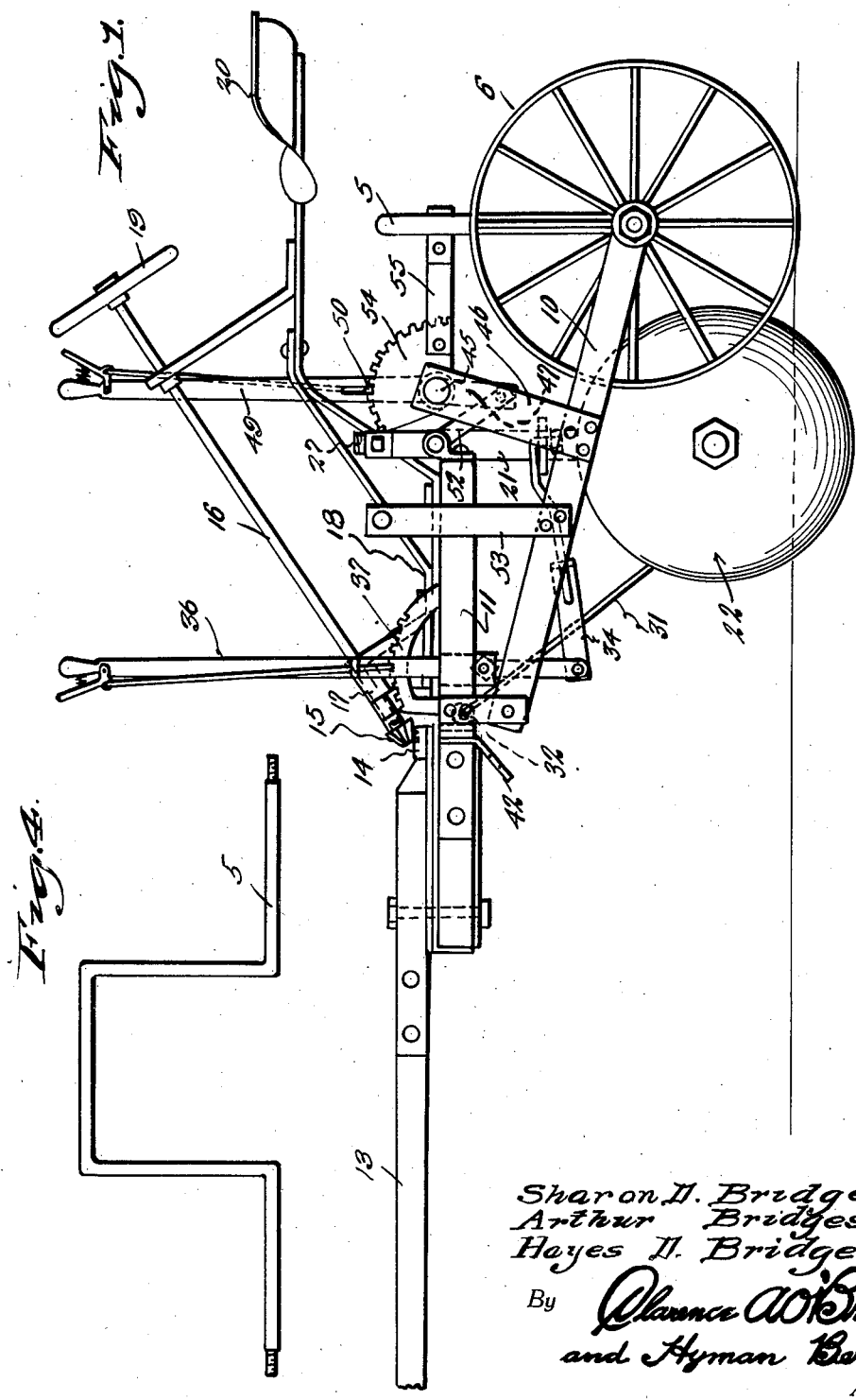
Inventor
Sharon D. Bridges
Arthur Bridges
Hayes D. Bridges
By Clarence A. O'Brien
and Hyman Berman
Attorneys

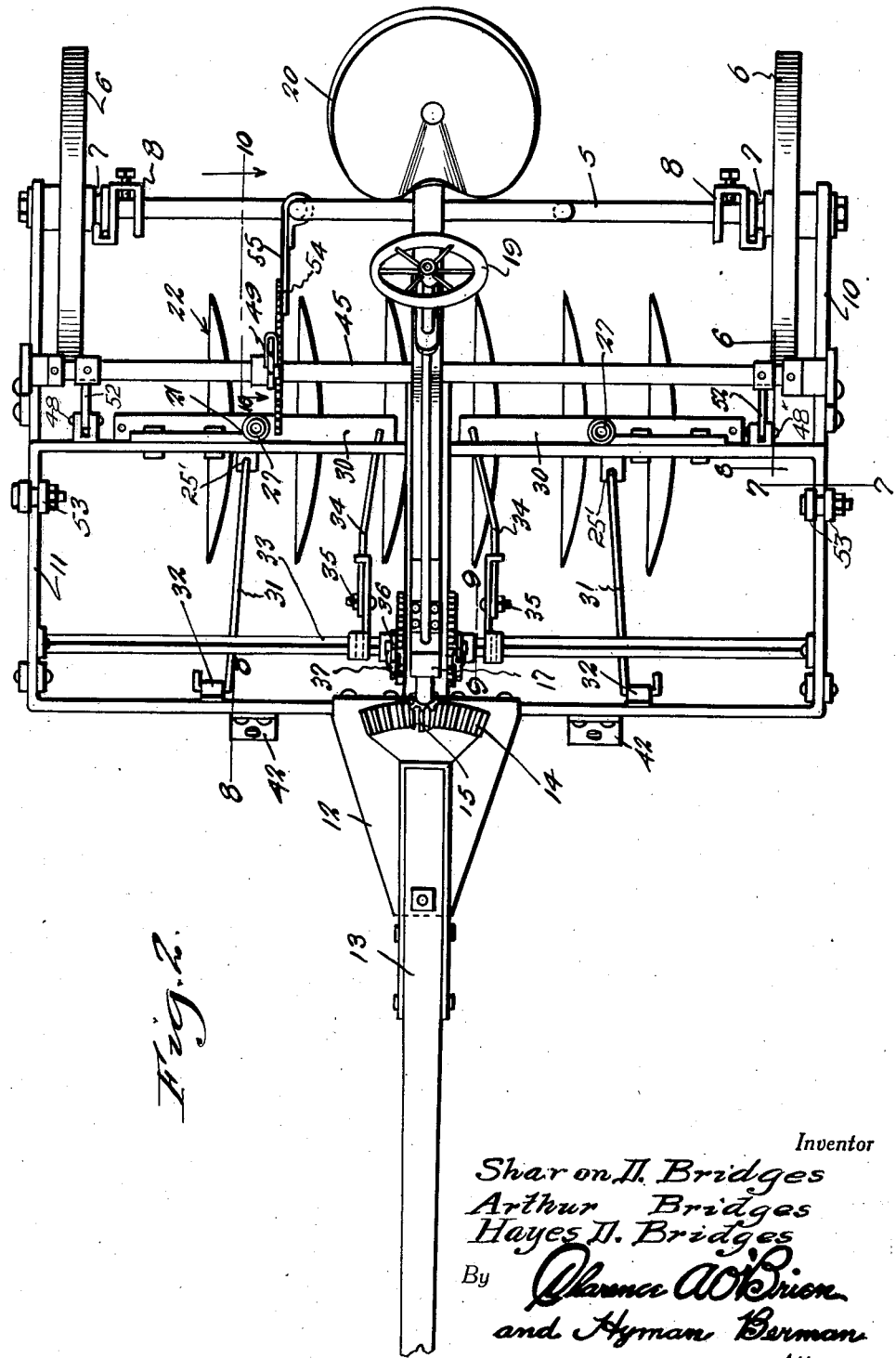

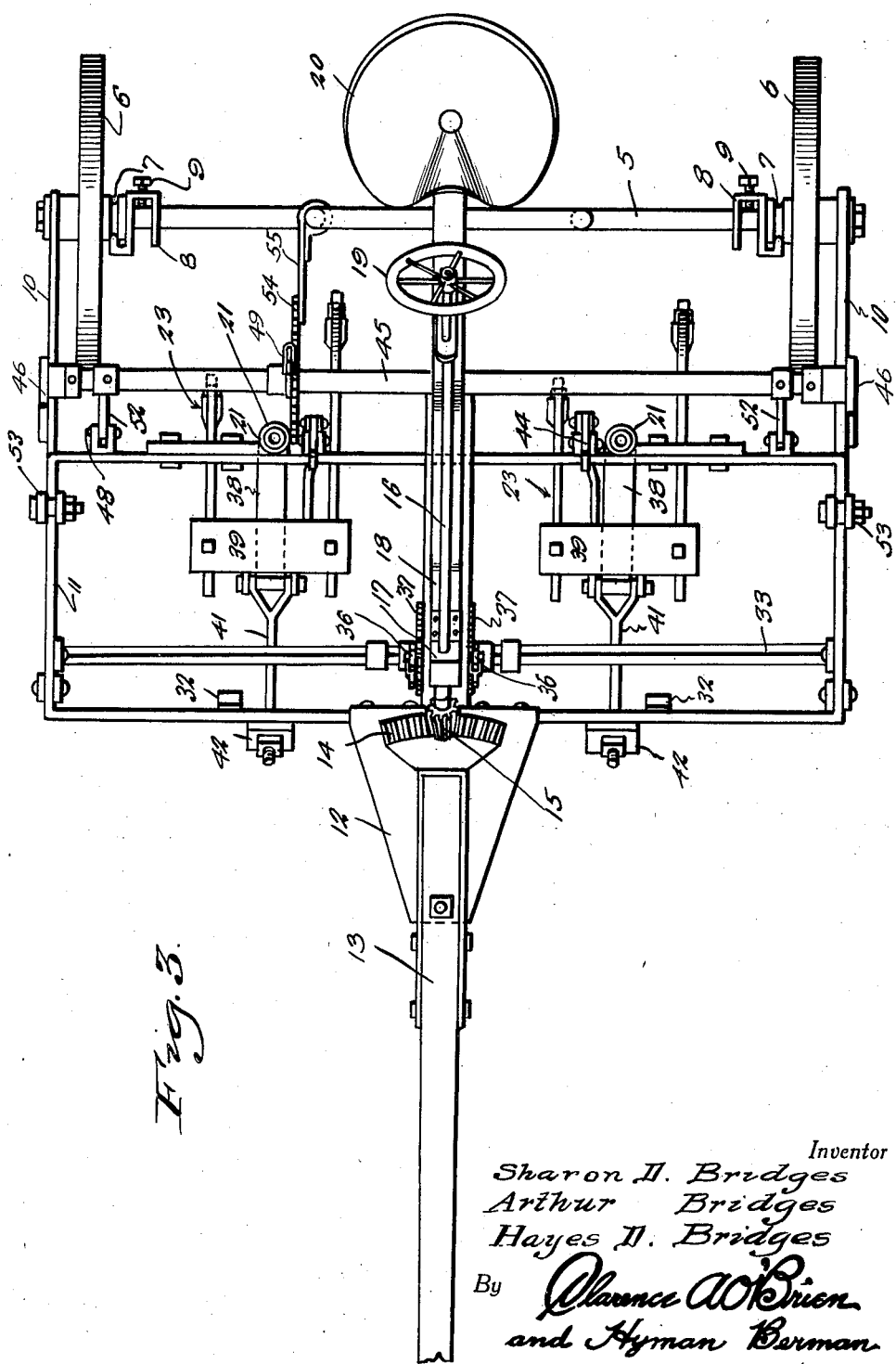

March 25, 1941.          S. D. BRIDGES ET AL          2,236,328
                              FARMING IMPLEMENT
                    Filed Jan. 31, 1939          5 Sheets-Sheet 4
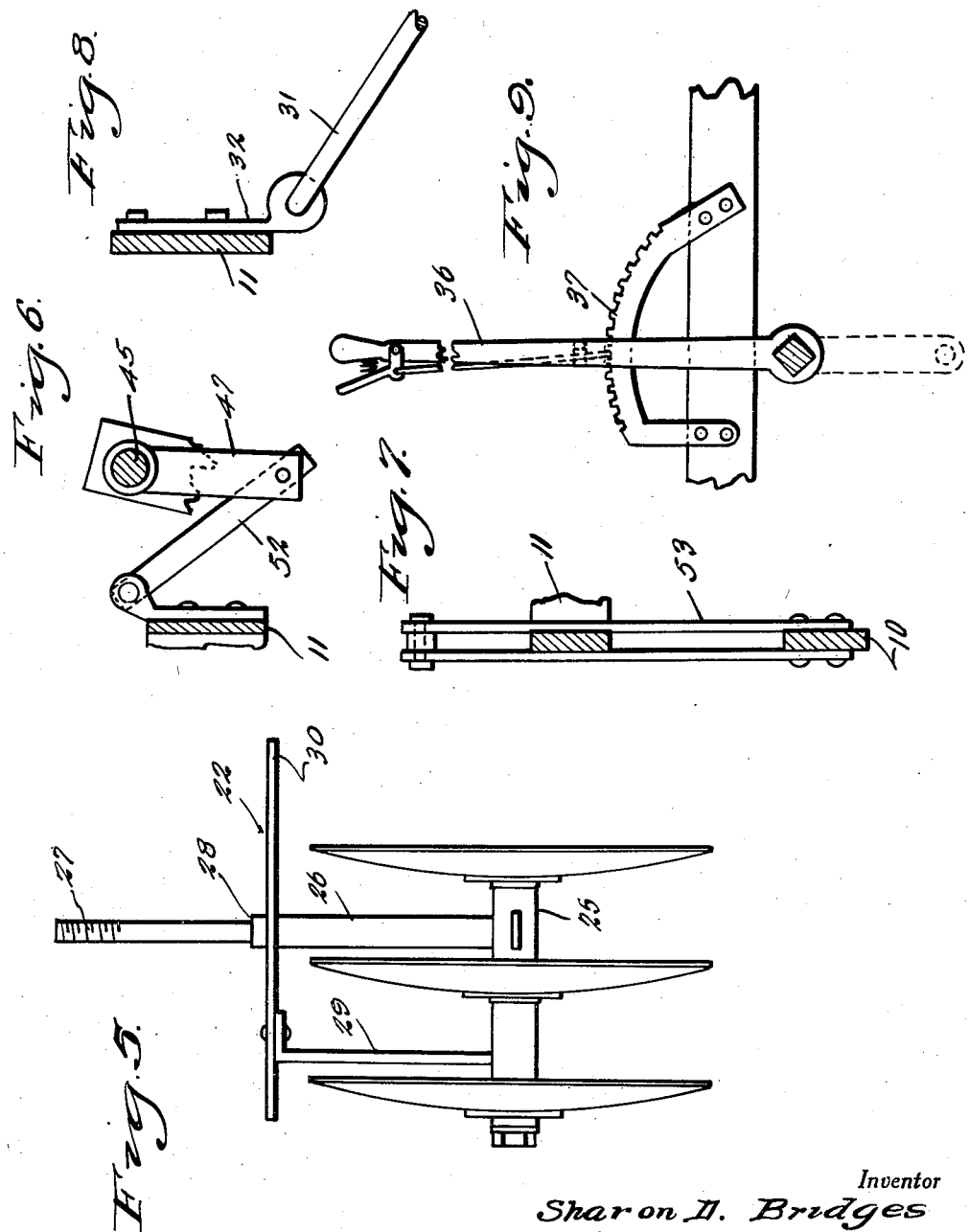
Inventor
Sharon D. Bridges
Arthur Bridges
Hayes D. Bridges
By Clarence A. O'Brien
and Hyman Berman
Attorneys March 25, 1941.  S. D. BRIDGES ET AL  2,236,328
FARMING IMPLEMENT
Filed Jan. 31, 1939   5 Sheets-Sheet 5
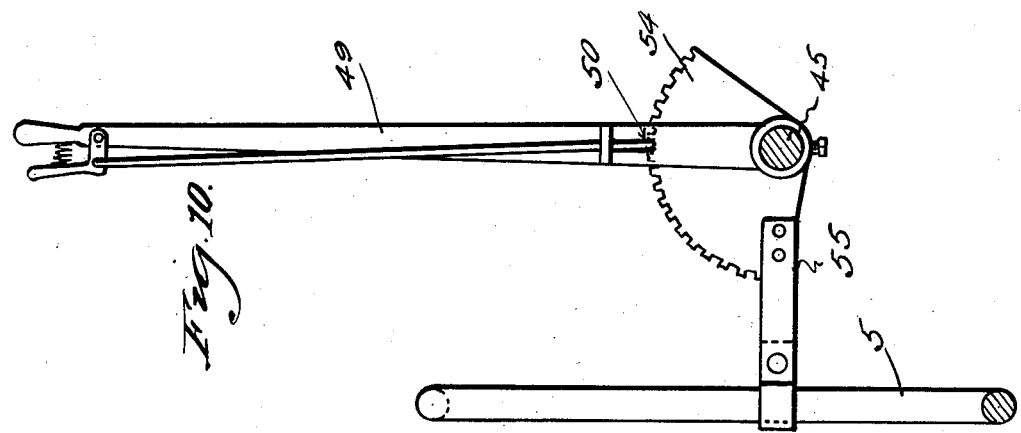
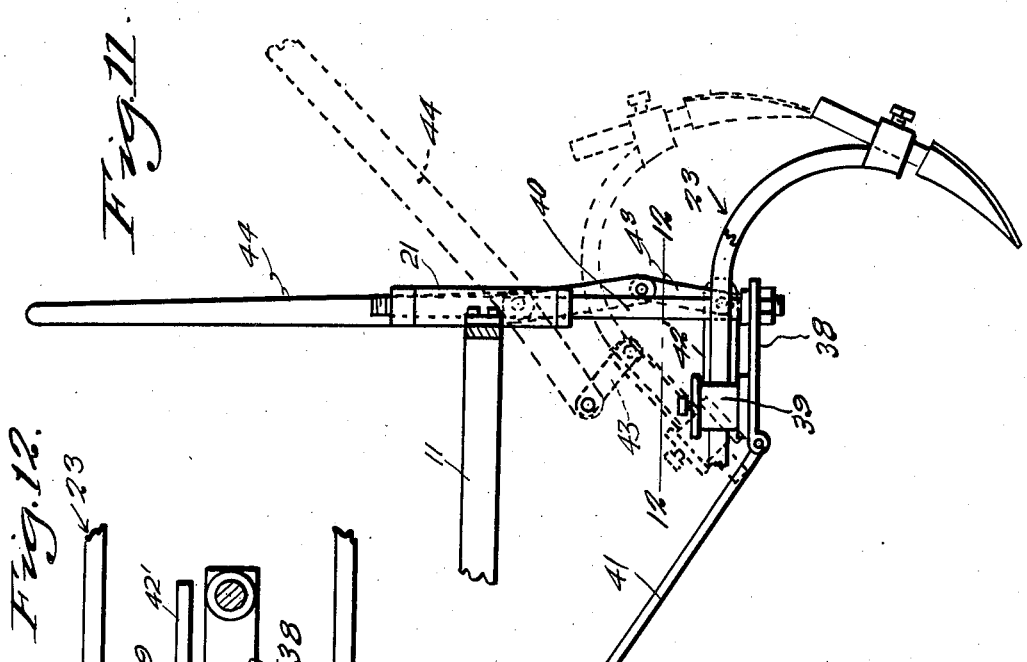
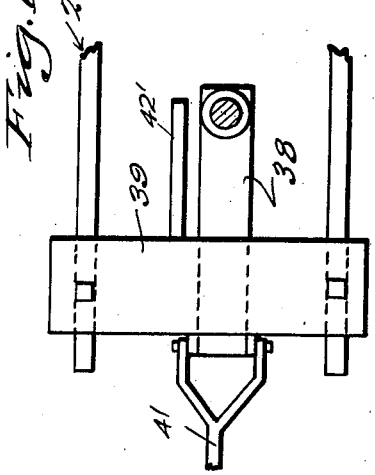
Inventor
Sharon D. Bridges
Arthur Bridges
Hayes D. Bridges
By Clarence A. O'Brien
and Hyman Berman
Attorneys Patented Mar. 25, 1941

2,236,328

UNITED STATES PATENT OFFICE 2,236,328

FARMING IMPLEMENT

Sharon D. Bridges, Arthur Bridges, and Hayes D. Bridges, New York, N. Y.

Application January 31, 1939, Serial No. 253,904

3 Claims. (Cl. 97—149)

This invention relates to farming implements of the motive power drawn type and has for the primary object the provision of a device of this character which may be successfully employed for harrowing and for cultivating soil, the construction thereof being such that the device may be readily adapted for either cultivating or harrowing through the simple application thereto of either shovels for cultivating or discs for harrowing, either of which are arranged in gangs on a supporting structure easily adjustable for regulating the action of the ground working elements in the soil.

With these and other objects in view, the invention consists in certain novel features of construction, combination and arrangement of parts to be hereinafter more fully described and claimed.

For a complete understanding of our invention, reference is to be had to the following description and accompanying drawings, in which Figure 1 is a side elevation illustrating a farming implement constructed in accordance with our invention and arranged for harrowing purposes.

Figure 2 is a top plan view illustrating the device with the harrowing discs applied thereto and arranged in gangs.

Figure 3 is a view similar to Figure 2 showing the application to the device of the cultivating implements arranged in gangs.

Figure 4 is a side elevation illustrating an arched axle.

Figure 5 is a front elevation illustrating one of the gangs of harrowing discs and the assembly of said discs.

Figure 6 is a detail sectional view taken on the line 6—6 of Figure 2.

Figure 7 is a detail sectional view taken on the line 7—7 of Figure 2.

Figure 8 is a detail sectional view taken on the line 8—8 of Figure 2.

Figure 9 is a fragmentary side elevation partly in section taken on the line 9—9 of Figure 2 and illustrating a control lever and its means for securing thereof in adjusted position.

Figure 10 is a detail sectional view taken on the line 10—10 of Figure 2.

Figure 11 is a fragmentary side elevation, partly in section, showing the means of elevating the cultivating implements from the ground.

Figure 12 is a sectional view taken on the line 12—12 of Figure 11.

Referring in detail to the drawings, the numeral 5 indicates an arched axle on which are journaled ground wheels 6, the hubs of said wheels having annular grooves 7 engaged by brackets 8 mounted on the axle 5 for adjustment endwise of said axle and held in adjusted position by set screws 9. The brackets 8 being adjustable on the axle 5 rotatably secure the wheels on the axle besides permitting the wheels to be adjusted endwise of the axle. Forwardly extending arms 10 are journaled on the ends of the axle 5 and are pivoted to opposite ends of an elongated frame 11. The frame 11 is positioned forwardly of the rear wheels and the forward side thereof has secured thereto a plate 12 arranged intermediate the ends of the frame on which is pivotally mounted a draft tongue 13. The latter may be hitched to a tractor or similar device in any well known manner and the rear end thereof carries a toothed plate 14 meshing with a gear 15 secured on a shaft 16 journaled in bearings 17 carried by a plate or like member 18 mounted on the frame. The shaft 16 has a hand wheel 19 secured thereto whereby the frame 11 may be adjusted at different angles with respect to the draft tongue 13 and consequently cause the travel of the implement either directly behind the tractor in a straight path or at an angle to the line of travel of the tractor.

The plate 18 forms a support for an operator's seat 20 located above and slightly rearwardly of the axle 5.

Secured on the rear side of the frame 11 are vertically arranged tubular bearings or sleeves 21 for the mounting on the frame 11 of gangs of harrowing discs 22 or gangs of cultivating implements 23. As shown in Figures 1, 2 and 5 gangs of harrowing discs are arranged for operation at opposite sides of the plate 18 and are capable of being turned or rotated about vertical axes provided by the sleeves 21 on the frame 11 so that the discs may have their angles of inclination varied relative to the path of travel of the farming implement behind the tractor.

The gangs of harrowing discs besides including the usual discs consist of an axle 25 on which are mounted the discs and to which is secured a vertically arranged stem 26 having a reduced screw threaded portion 27 and a shoulder 28. Also secured on the axle or shaft 25 is an upstanding bracket 29 carrying a horizontally arranged hitch plate 30. The members 26 of the gangs 22 are rotatably mounted in the bearing sleeves 21 with the lower ends of the sleeves resting on the shoulders 28. The axles 25 have pivoted thereto, as at 25', forwardly extending connecting links 31 hinged on the front side of the frame 11, as shown at 32, so that the forward pull on the gangs of discs will be from the frame 11 through the connecting links 31, the latter being located in alignment with the members 26 so that pivotal movement of said members in the bearing sleeves may be had.

Journaled on the frame 11 and the plate 18 are shafts 33 and secured to the latter are connecting links 34 which in turn are pivotally connected to the hitch plates 30 of the disc gangs. Each connecting link 34 includes a pair of sections rigidly connected, as shown at 35, whereby on rotation of the shafts 33 in one direction the gangs of discs 22 will be swung about their axes in one direction and rotation of the shafts 33 in an opposite direction brings about swinging of the gangs about their axes in an opposite direction. In order to rotate the shafts 33 in opposite directions hand levers 36 are secured thereon and have conventional means 37 for releasably securing the hand levers in their various adjusted positions. As shown in Figures 3 and 11 gangs of cultivating implements 23 are applied in place of cultivator discs 22.

The gangs of cultivating implements 23 besides employing the usual ground engaging members including shovels, each consists of a plate 38 on which the implements 23 are mounted as shown at 39. The plates 38 have secured thereto members 40 constructed similarly to the members 26 and which are received by the sleeves 21 whereby the cultivating implements are mounted in said sleeves. The plates 38 have hinged thereto draft links 41 which are in turn secured to brackets 42 on the forward side of the frame 11. The members 39 which connect the cultivating implements on the plates 38 are hinged on said plates and are provided with arms fixed thereto, as shown at 42', and pivoted to the latter are links 43 pivotally connected to hand levers 44 pivoted on the frame 11 whereby said cultivating elements may be elevated away from the ground as shown in dotted lines in Figure 11.

In order to pivot the frame 11 on the arms 10 for the purpose of regulating the depth of action of the gangs of cultivating implements or the gangs of harrow discs in the soil, a shaft 45 is journaled in brackets 46 carried by the arms 10 rearwardly of the forward ends and which positions the shaft 45 in a plane substantially with the frame 11. The shaft 45 has secured thereto arms 47 which are pivotally connected on the rear side of the frame, as shown at 48, so that when the shaft is rotated in one direction the frame will be rocked on the forward ends of the arms in one direction and the rotation of the shaft in an opposite direction will bring about rocking of the frame 11 on the forward ends of the arms 10 in an opposite direction whereby the depth of action of the gangs of cultivating implements or harrow discs may be varied in the soil. A hand lever 49 is secured on the shaft 45 for the rotation of said shaft in either direction and is equipped with the usual securing means 50 whereby the hand lever may be held in its various adjusted positions. The arms 47 on the shaft 45 are connected to the frame 11 through mediums of links 52, said links being pivoted on the frame 11 and on the arms 47, as clearly shown in Figure 6.

Connected spaced guide plates 53 are secured on the arms 10 and straddle the frame 11 for guiding the rocking motion thereof on the pivotal connections between the forward ends of the arms 10 and the frame 11. The usual securing means 50 for the hand lever 49 includes a quadrant 54 mounted on the axle 5 by a bracket 55 with the quadrant journaled on the shaft 45.

From the foregoing description taken in connection with the accompanying drawings it will be noted that the farming implement may be caused to travel directly in the path of the tractor or at an angle to the path of travel through the manipulation of the hand wheel 19. Further, it will be noted that the gangs of harrowing discs 22 may be swung about vertical axes so that said discs when acting in the soil will be either in alignment with the direction of travel of the tractor or at an angle thereto. Through the adjustment of the harrowing implements about a vertical axis the device may be caused to harrow the soil either towards or from the vegetation arranged in rows. It will be understood that the device straddles the row of vegetation, the axle 5 being arched for that purpose.

It is contended that this farming implement will accomplish efficient work and that the implements adapted thereto may be made to operate in the soil at different depths and that the device will efficiently perform over uneven or cloddy soil and that the operator can cause the device to follow a row of growing vegetation regardless of variance from a straight line.

It is believed that the foregoing description, when taken in connection with the drawings will fully set forth the construction and advantages of this invention to those skilled in the art to which such a device relates, so that further detailed description will not be required.

Having thus described the invention, what we claim is:

1. A farming implement comprising a frame, means for connecting the frame to a draft medium whereby the frame may swing relative thereto, a hand operated means for effecting swinging movement of the said frame, an axle arranged rearwardly of the frame, ground wheels for said axle, arms journaled on said axle and pivotally connected to the frame, a hand operated means for effecting pivotal movement of said arms, vertically arranged sleeves carried by the frame, shafts detachably secured in said sleeves and removable therefrom, mountings for ground engaging elements secured to said shafts and having ground implements pivotally mounted thereon for vertical swinging movement, and a hand operated means carried by the frame for swinging said implements.

2. In a cultivator, a wheel supported axle, a pair of draft arms extending forwardly from opposite ends of said axle, respectively, a rectangular draft frame including front and rear bars, respectively, and side bars pivotally mounted adjacent the front ends thereof on the front ends of said draft arms, respectively, whereby said frame is adapted for vertical tilting on said arms, a draft tongue attached to the front bar of said frame, pairs of cultivator implements below said frame, a pair of suspension mountings for attaching said pairs of implements to the rear bar of said frame, respectively, whereby under tilting of the frame in opposite directions said implements may be raised and lowered in unison, and means to tilt said frame including a hand lever, said mountings comprising, respectively, a depending post secured to said rear bar, a horizontal draft bar extending forwardly from the lower end of said post, a draft link extending from the front end of said draft bar to the front bar of said frame, a pair of implement carrying beams upon opposite sides of said draft bar, a cross bar connecting said beams together rigidly and pivotally mounted on said draft bar for vertical swinging movement to raise and lower said beams and thereby raise and lower the implements thereon independently of tilting of said frame, and manipulative means for swinging the cross bars selectively.

3. In a cultivator, a wheel supported axle, a pair of draft arms extending forwardly from opposite ends of said axle, respectively, a rectangular draft frame including front and rear bars, respectively, and side bars pivotally mounted adjacent the front ends thereof on the front ends of said draft arms, respectively, whereby said frame is adapted for vertical tilting on said arms, a draft tongue attached to the front bar of said frame, pairs of cultivator implements below said frame, a pair of suspension mountings for attaching said pairs of implements to the rear bar of said frame, respectively, whereby under tilting of the frame in opposite directions said implements may be raised and lowered in unison, means to tilt said frame including a hand lever, said mountings comprising, respectively, a depending post secured to said rear bar, a horizontal draft bar extending forwardly from the lower end of said post, a draft link extending from the front end of said draft bar to the front bar of said frame, a pair of implement carrying beams upon opposite sides of said draft bar, a cross bar connecting said beams together rigidly and pivotally mounted on said draft bar for vertical swinging movement to raise and lower said beams and thereby raise and lower the implements thereon independently of tilting of said frame, and manipulative means for swinging the cross bars selectively, comprising hand levers pivoted on said frame and each operatively connected to one of said cross bars.

SHARON D. BRIDGES.
ARTHUR BRIDGES.
HAYES D. BRIDGES.